(12) United States Patent
Edye

(10) Patent No.: US 11,528,905 B2
(45) Date of Patent: Dec. 20, 2022

(54) DISPOSABLE SLEEVE HAVING AN ANTIMICROBIAL PROPERTY FOR COVERING AN ARM OF A PAIR OF SPECTACLES

(71) Applicant: Edye Pty Ltd, Grafton (AU)

(72) Inventor: Donna Edye, Grafton (AU)

(73) Assignee: EDYE PTY LTD, Grafton (AU)

( * ) Notice: Subject to any disclaimer, the term of this patent is extended or adjusted under 35 U.S.C. 154(b) by 260 days.

(21) Appl. No.: 16/079,153

(22) PCT Filed: Feb. 21, 2017

(86) PCT No.: PCT/AU2017/050149
§ 371 (c)(1),
(2) Date: Aug. 23, 2018

(87) PCT Pub. No.: WO2017/143390
PCT Pub. Date: Aug. 31, 2017

(65) Prior Publication Data
US 2019/0045782 A1    Feb. 14, 2019

(30) Foreign Application Priority Data

Feb. 24, 2016 (AU) ................. 2016900666

(51) Int. Cl.
| | | |
|---|---|---|
| *A01N 25/34* | (2006.01) | |
| *G02C 11/00* | (2006.01) | |
| *G02C 13/00* | (2006.01) | |
| *G02C 5/14* | (2006.01) | |

(52) U.S. Cl.
CPC ............. *A01N 25/34* (2013.01); *G02C 11/00* (2013.01); *G02C 13/00* (2013.01); *G02C 5/14* (2013.01); *G02C 5/143* (2013.01)

(58) Field of Classification Search
CPC . G02C 11/00; G02C 5/14; G02C 5/00; G02C 11/12
See application file for complete search history.

(56) References Cited

U.S. PATENT DOCUMENTS

| | | | | |
|---|---|---|---|---|
| 4,732,465 A | * | 3/1988 | Field | G02C 11/00 351/123 |
| 5,583,585 A | | 12/1996 | Sternberg et al. | |
| 5,882,667 A | | 3/1999 | Jones | |
| 8,167,426 B2 | * | 5/2012 | Lampru | G02C 11/02 351/52 |
| 2001/0043308 A1 | | 11/2001 | Menuck et al. | |
| 2006/0045899 A1 | * | 3/2006 | Sarangapani | A01N 59/16 424/405 |
| 2007/0195259 A1 | | 8/2007 | Olsson | |
| 2010/0139824 A1 | | 6/2010 | Daniel | |
| 2014/0120168 A1 | * | 5/2014 | Oldenburg | A01N 59/16 424/497 |
| 2018/0116208 A1 | * | 5/2018 | Hamano | A01N 31/02 |

FOREIGN PATENT DOCUMENTS

| | | |
|---|---|---|
| CN | 2565356 Y | 8/2003 |
| GB | 2200473 A | 8/1988 |
| WO | 2007/002977 A1 | 1/2007 |
| WO | 2007/101045 A1 | 9/2007 |

* cited by examiner

*Primary Examiner* — Hasan S Ahmed
(74) *Attorney, Agent, or Firm* — Dilworth & Barrase, LLP

(57) ABSTRACT

A disposable sleeve having an antimicrobial property for covering an arm of a pair of spectacles is presently disclosed. The disposable sleeve comprises a generally tubular body having an opening at least one end thereof for receiving the spectacle arm, and at least one antimicrobial agent containing component applied to a surface of the tubular body and/or dispersed therein to impart the antimicrobial property thereto.

21 Claims, 8 Drawing Sheets

(i)

(ii)

DISPOSABLE SLEEVE HAVING AN ANTIMICROBIAL PROPERTY FOR COVERING AN ARM OF A PAIR OF SPECTACLES

FIELD OF THE INVENTION

The present invention relates to covers for protecting spectacles in use and in particular to a disposable sleeve and a disposable cover each having an antimicrobial property for respectively covering an arm and a nose bridge portion of a pair of spectacles.

The invention has been developed primarily for use with spectacles when worn in a medical and/or healthcare setting and will be described hereinafter with reference to this application. However, it will be appreciated that the invention is not limited to this particular field of use.

BACKGROUND OF THE INVENTION

Healthcare workers are more likely than others in the wider community to be exposed to infectious, biological agents, such as microbes, pathogens, bacterial, viral, and fungal contamination, through their day to day dealings with patients, and more particularly, their frequent exposure to the blood and/or other bodily fluids of said patients. By the same token, those patients who may be visiting a hospital or surgery, or simply, other people who may be employed in the healthcare industry, may also be at risk of both infection and transmission, making them a likely source of infectious agents and thus a common susceptible host.

The risk of Healthcare Associated Infection within a healthcare setting, in particular an operating theatre where surgical site and wound infection is most prevalent on account of the people involved being the major source of environmental contamination. Indeed, cross-contamination and wound infection stems not only from exposure to the natural flora found on skin, but also from the inadvertent transfer of infectious agents, directly or indirectly, via contact, droplets, or airborne transfer. Even on a microscopic level, the inadvertent transfer or cross-contamination to and from healthcare personnel, surgeons, surgical staff, patients, inanimate objects/surfaces and the immediate environment, is a major cause for concern.

There is a microbial burden associated with "high touch" surfaces within the healthcare industry. Take for example, prescription eyewear, such as those worn by patients, surgical and healthcare personnel, the high touch areas on such eyewear are typically those areas frequently touched by the wearer, either consciously or subconsciously, in order to put on, adjust, and/or remove the eyewear. Such high touch surfaces have not been ruled out as a focal source of contamination.

Regardless of finish, such eyewear can and will become dirty, grimy, and/or dusty with daily wear. For example, when a wearer puts a pair of spectacles on or removes them, oils from your skin or hair that contain bacteria, such as *staphylococci, diphtheroid* organisms, *pseudomonas* and *propionibacterium* species, is transferred to the high touch areas of the spectacles, notably the spectacle arms, hinge portions and nose bridge portion. In this respect, any grease, dirt and bacteria that may seep from the wearer's skin, coupled with any exposure the wearer may have had to any other infectious biological agents and/or hazardous chemicals through inadvertent contact with inanimate surfaces or other persons, or even transfer from microscopic airborne microbes and droplets, make spectacles highly susceptible to cross-contamination, thereby representing a fertile breeding ground for infection.

Inanimate surfaces have often been described as a major source for outbreaks of nosocomial infections. For instance, Staphylococcus Aureus(including MRSA), Escherichia Coli, Mycobacterium Tuberculosis and Clostridium Difficile have been reported to survive on dry surfaces for months. Similarly, *Candida Albicans* as the most important nosocomial fungal pathogen has been reported to survive on surfaces for up to 4 months, while a number of viruses from the respiratory tract, including influenza, SARS or rhino virus, can persist on surfaces for a few days. Other viruses, including those from the gastrointestinal tract, such as the astrovirus, HAV, polio- or rotavirus, have been reported to persist for approximately 2 months, while blood-borne viruses, such as HBV or HIV, have been reported to persist for more than one week. In this respect, such viruses can be present on a contaminated surfaces for days, weeks and even months after being contaminated, thereby representing a prolonged source of transmission.

More recently, in the case of the human norovirus, it has been reported that cross-contamination through contact can assist in further propagating the spread of human norovirus in outbreak settings. For example, studies have shown that even after several attempts to decontaminate a surface contaminated with the human norovirus can still result in the virus being transferred to an unsuspecting person, even after multiple decontamination steps using standard procedures. It has also been reported that the cleaning cloths used to decontaminate such a surface also represent a means by which to transfer the virus to clean hands and/or surfaces such as eyewear.

In short, prescription eyewear worn by patients or healthcare personnel during either routine janitorial functions in medical/healthcare facilities or whilst attending to patients, will invariably be handled by the wearer at some point during the day, either consciously or subconsciously. As such, the likelihood that the high touch surfaces of the eyewear will become contaminated through exposure to infectious biological agents for example, bodily fluids, blood spray patient waste or fluids, and/or potentially hazardous chemicals increases every time the wearer is exposed to such conditions.

Where chemicals, biological agents and their associated toxins may already be present on a person's spectacles, contamination, manifestation and proliferation may also occur simply via the wearer unwittingly and inadvertently transferring such infectious biological agents and/or chemicals to either other healthcare personnel, surgeons, surgical staff or patients, or to inanimate surfaces within the immediate environment merely by touching, adjusting or removing the spectacles for example during, before, or after performing surgery or a healthcare/medical examination or routine procedure.

The standard eye protection or personal protective equipment (PPE) worn by healthcare professionals in a sterile hospital setting such as an operating theatre includes face shields or goggles. Such PPE is designed to be used by healthcare professionals to protect their face and more particularly, the mucous membranes in their eyes, from splashing, spraying or splattering of blood, bodily fluids or other potentially infectious fluid and airborne microbes that might occur during the procedure. However, in the case of spectacle wearers, not all goggles and face shields extend far enough around the wearer's head to protect all parts of the spectacles. For example, it is often the case that the spectacle arms from the distal tip around or above the ear to the hinge portion are not protected by the PPE, thereby exposing these parts of the spectacles to the potential contamination, manifestation and proliferation of infectious biological agents and/or contamination by hazardous chemicals.

In light of the fact that transfer and exposure to hazardous chemicals and microbes can occur on a microscopic level and without knowledge of the event, it has been proven that many surgeons and operating personnel have foregone the use of protective eyewear such as goggles preferring to wear their own prescription glasses and rely solely upon their prescription glasses as a sole source of protection, despite spectacles being shown to offer an ineffective safeguard against blood splash injury. Thereby opening a passageway for cross contamination and exposure of the spectacle arm to the contamination, manifestation and proliferation of hazardous chemicals, microbes and their associated toxins By the same token, where some settings, such as hospitals, are likely to have access to PPE, other settings may not. Exposure to hazardous chemicals, biological agents and their associated toxins is an unavoidable occupational risk for most healthcare personnel. In particular scenarios like minimally invasive medical procedures, examinations at GP clinics, long term aged care facilities, dentists and food preparation areas to name but a few, it may not be necessary to wear PPE such as face shields or goggles. This would therefore substantially increase the risk of a potential passageway for the cross-contamination, manifestation and proliferation of hazardous microbes and chemicals, via the high touch surface areas of the eyewear, being the spectacle arms, hinge portions and nose bridge portion.

Commonly used techniques to sterilise medical devices within the healthcare industry include Hydrogen Peroxide Gas Plasma, 100% Ethylene Oxide (ETO), Peracetic Acid and steam. However, such sterilization techniques are often costly and there use is strictly limited to medical devices made from specific materials, as the extreme conditions associated with such sterilization techniques may damage or corrode the devices being sterilized. Additionally, such sterilization techniques have cycle times of up to 75 minutes in length. Thus, in the case where the device to be sterilized is a pair of prescription spectacles, the lengthy cycle times associated with such sterilisation methods may mean that the wearer is unable to use their prescription spectacles for long periods at a time, making it necessary for the wearer to own multiple pairs of spectacles. Therefore, the use of standard sterilization techniques such as heat, chemical or radiation sterilization for sterilizing contaminated spectacles may cause permanent discolouration and/or damage to the spectacles through repeated sterilisation.

As a result, an alternative and common method by which healthcare personnel have to resort to in order to clean their spectacles after a medical procedure involves the use of antiseptic/disinfectant wipes. However, the intrinsic design of various parts of the spectacles, in particular the hinge portions, precludes someone from completely decontaminating the spectacles, thereby representing a potential hazard to the wearer and others when the spectacles are worn again.

The present invention seeks to provide a disposable sleeve and a disposable cover each having an antimicrobial property for respectively covering an arm and a nose bridge portion of a pair of spectacles, which will overcome or substantially ameliorate at least some, if not all, of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect of the present invention, there is provided a disposable sleeve having an antimicrobial property for covering an arm of a pair of spectacles, the disposable sleeve comprising:

a generally tubular body having an opening at at least one end thereof for receiving the spectacle arm; and at least one antimicrobial agent containing component applied to a surface of the tubular body and/or dispersed therein to impart the antimicrobial property thereto.

Preferably, the at least one antimicrobial agent containing component comprises an antimicrobial agent selected from the group consisting of an oligodynamic metal ion, a quaternary ammonium compound, a biocide, an antibiotic and a photocatalyst.

Preferably, the oligodynamic metal ion is derived from a metal selected from the group consisting of silver, gold, platinum, palladium, iridium, copper, antimony, bismuth, zinc and alloys thereof.

Preferably, the at least one antimicrobial agent containing component comprises a silver metal ion containing component.

Preferably, the silver metal ion containing component comprises a silver salt component selected from the group consisting of silver acetate, silver benzoate, silver carbonate, silver chloride, silver iodate, silver iodide, silver lactate, silver laurate, silver nitrate, silver oxide, silver palmitate and silver sulfadiazine.

Preferably, the at least one antimicrobial agent containing component comprises a plurality of particles, each particle having oligodynamic metal ions applied to a surface thereof and/or dispersed therein.

Preferably, the particles comprise particles of glass, silica or titanium dioxide.

Preferably, the at least one antimicrobial agent containing component comprises a plurality of zeolite particles, each zeolite particle having a plurality of ion-exchangeable sites for retaining oligodynamic metal ions via an ion-exchange reaction.

Preferably, the at least one antimicrobial agent containing component comprises a plurality of particles of copper or silver.

Preferably, the or each copper or silver particle has dimensions on a nano-, pico- or angstrom-scale.

Preferably, the at least one antimicrobial agent containing component comprises colloidal silver.

Preferably, the biocide is selected from the group consisting of benzalkonium chloride, chlorhexidine and triclosan.

Preferably, the biocide comprises an antimicrobial peptide.

Preferably, the photocatalyst is selected from the group consisting of titanium dioxide and zinc oxide.

Preferably, the at least one antimicrobial agent containing component is applied to the surface of the tubular body by chemical and/or physical modification of the surface.

Preferably, the surface of the tubular body is an external surface that has been thermally embossed to provide a micro- or nano-topography.

Preferably, the tubular body is formed from a polymer selected from the group consisting of: silicones, neoprene, polyisoprenes, polybutadiene polychloroprenes, polystyrenes, polyurethanes, polyolefins, polyvinyls, natural rubbers, synthetic rubbers, latex and mixtures thereof.

Preferably, at least one portion of the tubular body is formed from a non-slip material to reduce movement of the sleeve along the spectacle arm in use.

Preferably, an inner surface of the tubular body is lined with a non-slip material to reduce movement of the sleeve along the spectacle arm in use.

Preferably, at least one portion of the tubular body is formed from a low frictional material to ease donning of the sleeve along the spectacle arm.

Preferably, an inner surface of the tubular body is lined with a low frictional material to ease donning of the sleeve along the spectacle arm.

Preferably, the tubular body is formed from a biodegradable material.

Preferably, the tubular body comprises at least one concertinaed portion configured to selectively extend or retract according to an overall length of the tubular body.

Preferably, the spectacle arm comprises a hinge portion located generally adjacent to a lens or a lens frame portion of the pair of spectacles, the tubular body being configured to substantially receive and seal the hinge portion therewithin in use.

Preferably, the spectacle arm comprises a temple tip located distal to a lens or a lens frame portion of the pair of spectacles, the tubular body extending from the temple tip substantially to the lens or lens frame portion in use.

Preferably, the tubular body is substantially closed at an opposing end thereof.

Preferably, the tubular body is seamless.

Preferably, the tubular body comprises at least one tab portion having no adhering qualities to facilitate manual application and/or ease of removal of the sleeve from the spectacle arm in use.

Preferably, the at least one tab portion is located adjacent the opening.

Preferably, the at least one tab portion is an extension of the tubular body at the opening thereof.

Preferably, the tubular body comprises at least one tab portion located adjacent the opening, the at least one tab portion comprising a low tack adhesive strip for temporarily adhering the at least one tab portion to one of an external portion of the tubular body, the spectacle arm, a lens and a lens frame portion of the pair of spectacles for securing the sleeve to the spectacle arm in a sealing engagement in use.

Preferably, the tubular body comprises first and second tab portions each located adjacent the opening, and each having complementary securing portions configured to engage one another to secure the sleeve to the spectacle arm in a sealing engagement use.

Preferably, the tubular body comprises at least one tab portion located adjacent the opening to facilitate sealing of a hinge portion of the spectacle arm substantially within the tubular body when the sleeve is secured to the spectacle arm in a sealing engagement in use.

Preferably, the at least one tab portion comprises a low tack adhesive strip for temporarily adhering the at least one tab portion to one of an external portion of the tubular body, the spectacle arm, a lens and a lens frame portion of the pair of spectacles for securing the sleeve to the spectacle arm in use.

Preferably, the tubular body comprises at least one portion that is manufactured from an elasticated material to conform snugly to a corresponding portion of the spectacle arm in use.

Preferably, at least one portion of an external surface of the tubular body is configured to receive indicia thereon.

According to a second aspect of the present invention, there is provided a kit for use with a pair of spectacles, the kit including:

one or more disposable sleeves according to any one of the preceding paragraphs of the first aspect; and a disposable nose bridge cover having an antimicrobial property for covering a nose bridge portion of the pair of spectacles, the disposable nose bridge cover comprising a sheet having at least one antimicrobial agent containing component that is applied to a surface thereof and/or dispersed therein, to impart the antimicrobial property thereto.

Preferably, the sheet is configured to wrap around the nose bridge portion and be secured in a sealing engagement thereto in use.

Preferably, the sheet comprises at least one tab portion to facilitate ease of removal of the nose bridge cover from the nose bridge portion by applying a pulling force thereto.

Preferably, the at least one tab portion comprises a low tack adhesive strip arranged for temporarily adhering the at least one tab portion to one of an external portion of the sheet when wrapped around the nose bridge portion, and the nose bridge portion itself, in order to secure the disposable nose bridge cover in a sealing engagement thereto in use.

Other aspects of the invention are also disclosed.

BRIEF DESCRIPTION OF THE DRAWINGS

Notwithstanding any other forms which may fall within the scope of the present invention, a preferred embodiment of the invention will now be described, by way of example only, with reference to the accompanying drawings in which.

DESCRIPTION OF EMBODIMENTS

Figure 1:
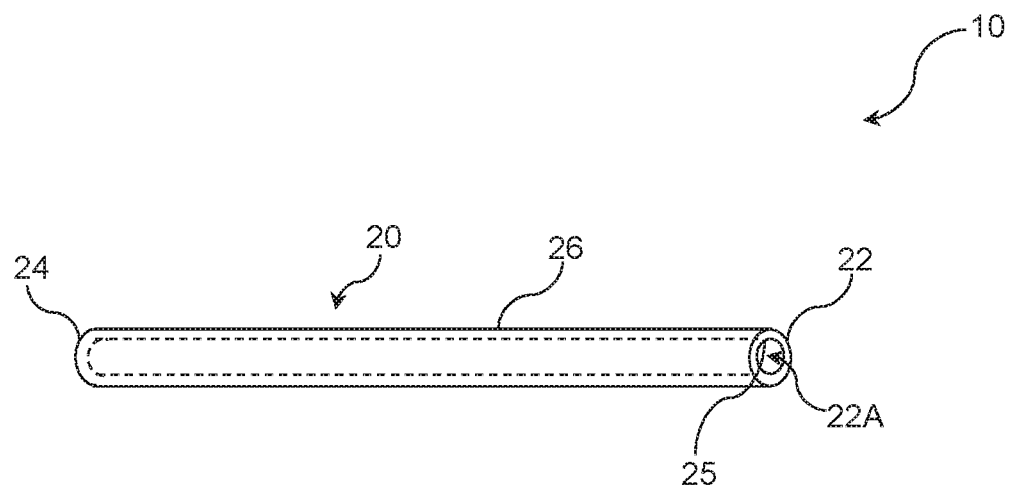
FIG. 1 shows a schematic representation of a disposable sleeve having an antimicrobial property for covering an arm of a pair of spectacles in accordance with a preferred embodiment of the present invention.

It should be noted in the following description that like or the same reference numerals in different embodiments denote the same or similar features.

The present invention is predicated on the finding of a disposable sleeve 10, 10A, 10B, 10C, 10D for covering an arm of a pair of spectacles 100 and a disposable nose bridge cover 500 for covering a nose bridge portion 120 of said spectacles 100, wherein the disposable sleeve and the disposable nose bridge cover each have an antimicrobial property for protecting or self-disinfecting the corresponding part(s) of the spectacle frame 110 of the spectacles 100, particularly the high touch areas of the spectacles 100, from contamination by infectious biological agents and their associated toxins and/or hazardous chemicals when the spectacles 100 are worn in a healthcare facility such as a doctor or dental surgery, a hospital, an operating theatre, an aged care facility, or in a food preparation area, and the like.

It will be appreciated by those skilled in the relevant art that the disposable antimicrobial sleeve and the disposable antimicrobial nose bridge cover described in the various embodiments below are not simply limited to use in the medical and healthcare sector, but may also find application in the personal care sector, the food sector, particularly during the preparation, packaging and serving of food, where dangerous food borne germs such as salmonella, *E. coli* and listeria are likely to present an issue.

Furthermore, applications may also be found in the chemical and life sciences sector, where the handling or exposure to particular chemicals and/or biological samples may contaminate and/or damage the spectacles 100.

FIG. 1 shows in its simplest form, a disposable sleeve 10 having an antimicrobial property for use in covering a spectacle arm 140A, 140B and the corresponding hinge portion 130A, 130B, of a pair of spectacles 100 according to a preferred embodiment of the present invention. The antimicrobial sleeve 10 comprises a generally elongate and hollow, tubular body 20 having a first end 22, with an opening 22A, and an opposing second end 24 that is substantially closed. The tubular body 20 further comprises an internal surface 25 and an external surface 26.

Figure 2:
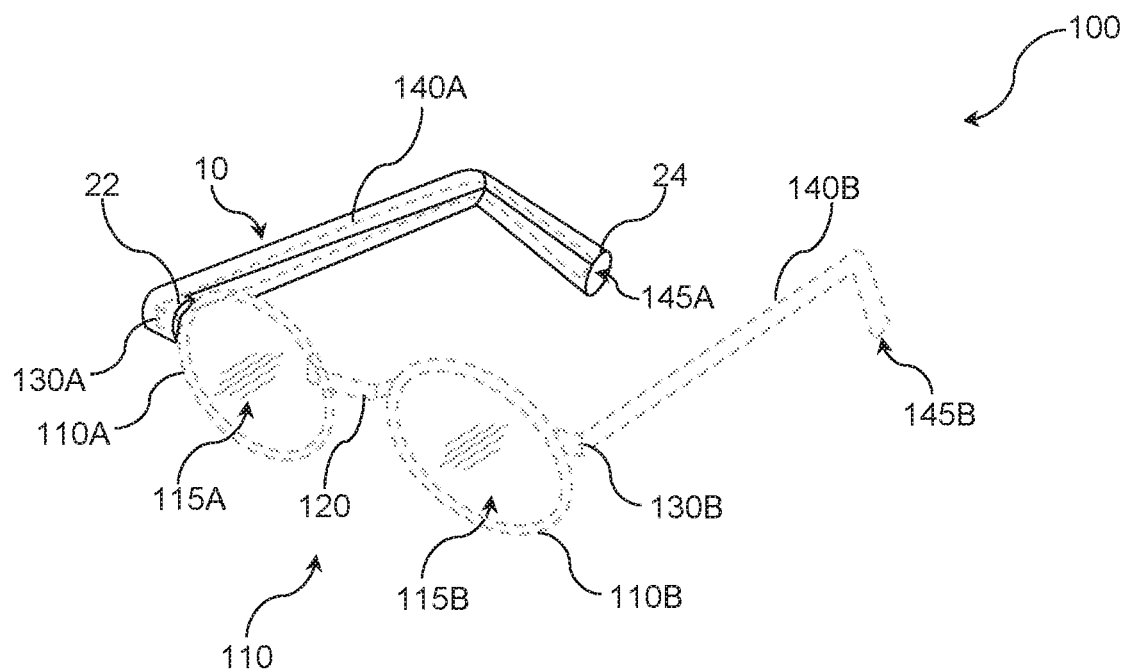
FIG. 2 shows a perspective view of the disposable antimicrobial sleeve of FIG. 1 being received on a corresponding arm of a pair of spectacles.

FIG. 2 shows a typical pair of spectacles 100 (indicated in dashed outline) upon which the antimicrobial sleeve 10 above can be applied in use. The spectacles 100 comprise a spectacle lens frame 110 defining two generally circular and spaced apart apertures 110A, 110B into which are fitted a corresponding lens 115A, 115B. The spectacle lens frame 110 also includes a generally elongate nose bridge portion 120 that connects the two spaced apart circular apertures 110A, 110B together. The spectacle lens frame 110 also includes a hinge portion 130A and 130B extending from an outer portion of each circular aperture 110A, 110B, to which is hingedly mounted, at a first end thereof, a corresponding elongate spectacle arm 140A and 140B. Disposed at a distal end of each spectacle arm 140A, 140B is a temple tip 145A, 145B.

Antimicrobial Property

The antimicrobial sleeve 10 comprises at least one antimicrobial agent containing component that is applied to the external surface 26 of the tubular body 20 as a coating, and/or is embedded or dispersed substantially throughout the material used in the manufacture of the tubular body 20 of the sleeve 10 so as to impart the desired antimicrobial, self-disinfecting property to the sleeve 10.

In one embodiment, the antimicrobial agent-containing component comprises oligodynamic metal ions. Suitable oligodynamic metal ions may be derived from a metal selected from the group consisting of silver, gold, platinum, palladium, iridium, copper, antimony, bismuth, zinc and alloys thereof.

While not wishing to be bound by any one particular theory, it will be understood that the antimicrobial action associated with oligodynamic metal ions is achieved by slow release of these metal ions from a suitable metal ion containing compound, and that the released ions react with the proteins within, for example, bacteria, rendering the protein inactive, which in turn, perturbs cellular function, disrupts membranes, and generally prevents the normal activity and reproduction of DNA, thereby essentially killing the microorganism.

It will be appreciated by those skilled in the relevant art that silver metal ions show good bioactivity at low concentrations.

Accordingly, in one embodiment, the antimicrobial agent containing component comprises a silver metal ion containing component selected from the group consisting of silver acetate, silver benzoate, silver carbonate, silver chloride, silver iodate, silver iodide, silver lactate, silver laurate, silver nitrate, silver oxide, silver palmitate and silver sulfadiazine.

In other embodiments, the antimicrobial agent containing component may comprise a plurality of particles, wherein oligodynamic metal ions such as silver metal ions are applied to a surface of each particle and/or substantially dispersed therein.

In one such embodiment, the particles may include particles of glass, silica or titanium dioxide, wherein the antimicrobial agent-containing component is coated to the surface of the particles using suitable physical or chemical absorption techniques. In another such embodiment, the particles may include aluminosilicate particles such as zeolite particles, wherein each zeolite particle comprises a plurality of ion-exchangeable sites for retaining such oligodynamic metal ions as silver metal ions via anion-exchange reaction.

In other embodiments, the antimicrobial agent-containing component comprises particles of an oligodynamic metal such as copper or silver. In one form, the antimicrobial agent comprises nano-, pico-, and/or angstrom-sized particles of silver. Such silver particles may be supplied as a colloidal solution or hydrosol suspension in water.

It will be appreciated that the antimicrobial agent containing component is not limited to the use of oligodynamic metal ions, but may include other antimicrobial agents. For instance, in other embodiments, the antimicrobial agent containing component may be selected from a quaternary ammonium compound, an antibiotic, or a biocide including, but not limited to, benzalkonium chloride, chlorhexidine compound such as chlorhexidine gluconate or chlorhexidine acetate, and triclosan.

By virtue of providing an antimicrobial sleeve 10, any contamination of the sleeve 10 caused by hazardous chemicals, biological agents and their associated toxins following involuntary exposure to the bodily fluids (for example, blood, saliva, vomit, faeces) of a patient during a medical examination or procedure, or simply via the wearer touching, adjusting or removing his/her spectacles 100 during such a procedure, will inherently be exposed to the antimicrobial action of the agent to kill the microorganism. This is particularly advantageous in the case of, for example, long surgical procedures where such microorganisms can multiply and spread rapidly, significantly increasing the likelihood of the microorganisms being transferred to the wearer of the spectacles 100, or to other individuals who may come into contact with the contaminated spectacles 100 through handling or human exposure.

In a preferred form, the tubular body 20 of the antimicrobial sleeve 10 is manufactured from a material having sufficient elasticity or flexibility to allow the sleeve 10 to conform snugly to not only the contour of the corresponding spectacle arm 140A, 140B but also to the hinge portion 130A, 130B in use. By virtue of this arrangement, it will be understood that the spectacle arm 140A, 140B and the hinge portion 130A, 130B are substantially enclosed within the tubular body 20, thereby restricting the corresponding 10 spectacle arm 140A, 140B and the hinge portion 130A, 130B from cross contamination to possible contaminants during use. The elasticity of the tubular body 20 also ensures that the sleeve 10 can be stretched easily, particularly longitudinally, so that when applying the sleeve 10 to the spectacle arm 140A, 140B it can be stretched over the spectacle arm 140A, 140B and over the generally wider hinge portion 130A, 130B, and form a tight seal to enclose the hinge portion 140A, 140B substantially within the sleeve 10. In addition, such flexibility and durability will also ensure that the tubular body 20 of the sleeve 10 can be applied to a wide range of spectacle arms 140A, 140B and corresponding hinge portions 130A, 130B of different size and shape, and still form a tight seal. By virtue of forming a snug fit, there is an increased likelihood of the sleeve 10 being retained in place on the spectacle arm 140A, 140B and hinge portion 130A, 130B during use.

In a preferred embodiment, the tubular body 20 of the antimicrobial sleeve 10 is manufactured from a polymer having good flexibility and viscoelasticity such as an elastomer.

Process

The antimicrobial sleeve 10 is ideally manufactured so that the tubular body 20 is seamless and continuous with no joins or perforations along its length between the first end 22 and the second end 24 that could allow a contaminant to seep through.

In one embodiment, the antimicrobial sleeve 10 may be formed by way of dipping. Outlined below is one particular process that may be employed in the manufacture of the antimicrobial sleeve 10 according to a preferred embodiment of the present invention.

According to a first step, the ammonia content of a suitable polymer such as latex is first reduced to about 0.1% by blowing air and by treating. A solution/dispersion of the latex is then prepared, to which a number of suitable additives including, but not limited to accelerators, cross-linking agents, colorants and the like, may be added to enhance the fabrication process.

According to a second step, a mould or prefabricated former (formed in the shape of the antimicrobial sleeve 10 to be formed) of aluminium, wood, glass or porcelain is first cleaned in sodium hypochlorite and nitric acid, or the like, and then dipped into a pre-prepared coagulant solution for use in inducing coagulation of the latex to so that it can deposit on the former.

According to a third step, the former, which is now coated with a thin layer of coagulant, is dipped into a vat comprising the solution/dispersion of latex.

In the case where an antimicrobial agent is to be embedded or dispersed substantially throughout the tubular body 20 of the antimicrobial sleeve 10, a suitable amount of the antimicrobial agent containing component is added to the latex solution/dispersion prior to dipping the former, so as to impart the desired antimicrobial property to the antimicrobial sleeve 10 once formed.

According to a fourth step, the mould former is removed from the vat and then rotated to ensure an even distribution and thickness of latex deposits on the former.

According to a fifth step, the latex film undergoes a first series of leaching to remove any residual coagulant.

According to a sixth step, the latex film is cured in hot air or steam. Once the latex has hardened around the mould former, it goes through a rinsing process to leach out any remaining residues and/or chemicals that may be left on the antimicrobial sleeve 10.

It will be appreciated that in the case of a radiation curable polymer, the polymer may be cured by exposure to a suitable wavelength of light.

In the case where the antimicrobial agent containing component is to be applied to the external surface 26 of the tubular body 20 of the antimicrobial sleeve 10, this may be achieved by dipping the polymer-coated former into a second vat comprising a solution or dispersion of the antimicrobial agent containing component prior to the curing step.

According to a final step, the antimicrobial sleeve 10 is removed from the mould former with the desired preformed shape to allow the antimicrobial sleeve 10 to conform snugly to the contour of the spectacle arm 140A, 140B and the corresponding hinge portion 130A, 1308 of a pair of spectacles 100.

Prior to packaging in readiness for marketing and/or shipping, the as-formed antimicrobial sleeve 10 may be sterilized according to a suitable sterilization process.

It will be appreciated by those skilled in the relevant art that the dipping process is just one possible method of manufacture, and that other processes for producing an antimicrobial sleeve 10 having the desired seamless and continuous tubular body 20 may also be employed.

It will be appreciated by those skilled in the relevant art that a number of polymers may be suitable for use in the dipping process. For example, the polymer may be selected from the group consisting of: silicones, polyisoprenes, polybutadiene, polychloroprenes such as neoprene, polystyrenes, polyurethanes, polyolefins, polyvinyls, natural rubbers such as latex, synthetic rubbers such as nitrile rubber, and mixtures thereof such as a nitrile/vinyl blend.

Ideally, the polymer is of a thickness that has the ability to resist liquid and viral permeation. Thickness is also an important component of the spectacle arm and bridge protection consistency for both durability and chemical/viral permeation. Additionally, good elasticity and flexibility allows the antimicrobial sleeve 10 to conform to the contour of the spectacle arm 140A, 140B and hinge portion 130A, 130B of the spectacles 100, while durability allows the antimicrobial sleeve 10 to resist tearing or puncturing, and tactile sensitivity provides the antimicrobial sleeve 10 with a good feel so as not to cause discomfort or irritation to the wearer in use.

Additional Additives

It will also be appreciated by those skilled in the relevant art that the elastomer or polymer solution/dispersion may comprise one or more other additives to aid in the manufacture of the antimicrobial sleeve 10 and/or provide the as-formed antimicrobial sleeve 10 with a desired property. Such additives may include, but are not limited to one or more of the following: colorants (for example, pigments), accelerators or retarders, coagulants to aid coagulation of the polymer around the former, flow enhancers, UV absorbers, light stabilizers, plasticizers and fillers, to name but a few.

Application/Removal

The antimicrobial sleeve 10 can be applied to a corresponding spectacle arm 140A, 140B of the pair of spectacles 100 simply by sliding it onto the spectacle arm 140A, 140B. For example, as shown in FIG. 2, the antimicrobial sleeve 10 is applied onto one (140A) of the two spectacle arms 140A, 140B of the pair of spectacles 100 by passing the corresponding distal or temple tip 145A through the opening 22A at the first end 22 of the tubular body 20 and then sliding the antimicrobial sleeve 10 along the full length of the spectacle arm 140A until the first end 22 substantially receives and envelopes the corresponding hinge portion 130A of the spectacle lens frame 110 therewithin, and the temple tip 145A of the corresponding spectacle arm 140A is substantially received within the closed end 24 of the tubular body 20. By virtue of this arrangement, the spectacle arm 140, 140B, and more particularly, the hinge portion 130A, 130B, is effectively isolated from the outside environment, thereby eliminating and preventing the cross contamination of hazardous chemicals, biological agents and their associated toxins, when in use.

It will be appreciated by those skilled in the relevant art that the antimicrobial sleeve 10 may be configured to accommodate spectacle arms 140A, 140B of varying size.

According to an alternative methodology, the antimicrobial sleeve 10 could be provided in a rolled form and then applied to the corresponding spectacle arm 140A, 140B simply by unrolling the antimicrobial sleeve 10 along the spectacle arm 140A, 140B in a similar manner to which a condom is applied.

To remove the antimicrobial sleeve 10 from the corresponding spectacle arm 140A, 140B, one simply slides the antimicrobial sleeve 10 back along the length of the spectacle arm 140A, 140B, or peels the antimicrobial sleeve 10 back over itself along the length of the spectacle arm 140A, 140B such that the antimicrobial sleeve 10 is gradually turned inside out. As such, the external surface 26 of the tubular body 20, contaminated during use, is now safely contained; thereby limiting exposure of the contamination to both the wearer and other persons who may come into contact with the contaminated antimicrobial sleeve 10. The contaminated antimicrobial sleeve 10 once removed from the corresponding spectacle arm 140A, 140B, can simply be discarded according to standard procedures.

Packaging

The antimicrobial sleeves 10 are ideally packaged for commercial sale as a single pair or multiples pairs of antimicrobial sleeves 10, in which each antimicrobial sleeve 10 of the pair is provided in a rolled form. This not only makes them easier to package, store, and apply, it also means that one can do away with the use of dispensing units, supply rolls, reservoir/cylinder for holding supply roll, covering, support sheets, carrier sheets, and folded stock webs or storage containers, thereby reducing material, production, transport and storage costs.

In other embodiments, the antimicrobial sleeves 10 may be packaged individually, as required.

Other properties

In other embodiments, the inner surface 25 of the tubular body 20 of the antimicrobial sleeve 10, or at least one portion thereof, may be treated or lined with a-non-slip material (not shown) to reduce movement of the antimicrobial sleeve 10 along the spectacle arm 140A, 140B in use so as to maintain the antimicrobial sleeve 10 in place, thereby protecting the spectacle arm 140A, 140B and, more importantly, the corresponding hinge portion 130A, 130B, from being exposed and contaminated by infectious agents and/or hazardous chemicals. Such materials may include materials having a high coefficient of friction.

In other embodiments, the inner surface 25 of the tubular body 20 of the antimicrobial sleeve 10, or at least one portion thereof, may be textured to reduce movement of the antimicrobial sleeve 10 along the spectacle arm 140A, 140B in use in order to yield a similar benefit. For example, in one form, the texturing may be formed from a multitude of small discrete globules or droplets of liquid rubber latex that have been cured on the inner surface 25 to form a plurality of closely related but definitively spaced apart nodules (not shown), wherein the axis of each nodule is generally perpendicular to the plane of the inner surface 25.

In an alternative form, the mould former may simply be patterned with a plurality of spaced apart nodules or holes (not shown), so that when the polymer solution/dispersion is applied to the mould former, and cured, the desired texturing can be formed on the inner surface 25 of the tubular body 20.

In other embodiments, texturing may be desired on the external surface 26 of the tubular body 20 of the antimicrobial sleeve 10 to reduce the likelihood of the spectacles 100 slipping while being worn in use. Such texturing may be achieved by applying a suitable non-slip compound to the polymer-coated former prior to curing.

Alternatively, texturing may be achieved on the external surface 26 by applying a suitable compound to the polymer coated former prior to curing, and then once cured, removing the compound by selectively dissolving the compound in a suitable solvent to leave a plurality of holes in the external surface 26 that constitute a textured surface. It will be appreciated by those skilled in the relevant art that the choice of solvent will depend on the relative solubility of the compound compared to the solubility of the polymer used to form the antimicrobial sleeve 10.

In other embodiments, the external surface 26 of the sleeve 10 may be physically modified to impart not only a non-slip feature to the antimicrobial sleeve 10 to reduce the likelihood of the spectacles 100 slipping while being worn in use, but in the case where the external surface 26 is physically modified to yield a specifically engineered micro- or nano-topography, such texturing may also provide an antimicrobial property to the sleeve 10. For example, in one form the physical modification of the external surface 10 of the tubular body 20 to produce an engineered micro- or nano-topography may be achieved through the use of thermal embossing against a similarly patterned mould produced by micro- or nano-lithography.

In other embodiments, an antimicrobial agent may be physisorbed onto the external surface 26 of the tubular body 20 using appropriate surface chemistry techniques.

In other embodiments, the external surface 26 of the sleeve 10 may be chemically modified to impart an antimicrobial property thereto. For example, an antimicrobial agent such as an antimicrobial peptide or a quaternary ammonium compound may be grafted or chemisorbed onto the external surface 26 using appropriate surface chemistry techniques.

In other embodiments, the external surface 26 of the tubular body 20 may be modified to provide a hydrophilic surface as opposed to a hydrophobic surface.

In other embodiments, the inner surface 25 of the tubular body 20 of the antimicrobial sleeve 10, or at least one portion (not shown) thereof, may be treated, lined or manufactured from a low frictional material to ease donning, more particularly, sliding, of the antimicrobial sleeve 10 along the spectacle arm 140A, 140B.

In one form, the low frictional material includes a fluoropolymer.

In other embodiments, the antimicrobial sleeve 10 may be manufactured from a biodegradable material.

In other embodiments, the antimicrobial sleeve 10 may be manufactured from a chemically resistant material. In one form, the chemically resistant material includes a fluoropolymer.

In other embodiments, the antimicrobial sleeve 10 may be manufactured from or contain products that have the ability to resist liquid and viral penetration. This is used where a biological agent that causes severe illness in humans and represents a serious risk for employees; the risk of dispersal among the population is high under some circumstances; effective preventive measures or treatment are not normally possible.

In other embodiments, the antimicrobial sleeve 10 may be manufactured from, or coated with, a polymer or elastomer that has the ability to release an antibiotic over time. In one form, the antibiotic is an antimicrobial peptide—novicidin. Antimicrobial peptides have been demonstrated to kill Gram-negative and Gram-positive bacteria, enveloped viruses, fungi and even transformed or cancerous cells.

In other embodiments, the antimicrobial sleeve 10 may be manufactured from a polymer or elastomer that comprises a photocatalyst either dispersed therein or applied to the external surface 26 thereof. These antimicrobial coatings when activated by light produce radical species through reaction with any microbes in contact with the external surface 26 to yield an oxidative or reductive effect that degrades the microbes, causing them to die. In one form, the photocatalytic material includes a photocatalytic titanium dioxide such as AEROXIDE™ ($TiO_2$ P25) or zinc oxide.

In other embodiments, the antimicrobial sleeve 10 may be manufactured from a polymer or elastomer having chemical modification of the surface with a protein and bacteria repellent coating.

In other embodiments, the inner surface 25 of the tubular body 20 of the antimicrobial sleeve 10 may comprise a low tack adhesive strip (not shown) located generally at the opening 22A at the first end 22 of the tubular body 20 for temporarily adhering the antimicrobial sleeve 10 to the corresponding spectacle arm 140A, 140B to which it has been applied, or alternatively to the corresponding hinge portion 130A, 130B.

In other embodiments, at least a portion (not shown) of the external surface 26 of the tubular body 20 of the antimicrobial sleeve 10 may be configured to receive indicia (not shown) or be printed upon. In this arrangement, this portion of the antimicrobial sleeve 10 can be used to for the purposes of providing information, such as instructions for use, or advertising space to promote the antimicrobial sleeve 10 by way of branding, the manufacturer or supplier of the antimicrobial sleeve 10, and/or other general advertising information.

Alternatively, the material used for producing the antimicrobial sleeve 10 may simply be transparent, translucent or have varying degrees of opaqueness as desired.

Concertinaed Portion

Figure 3:
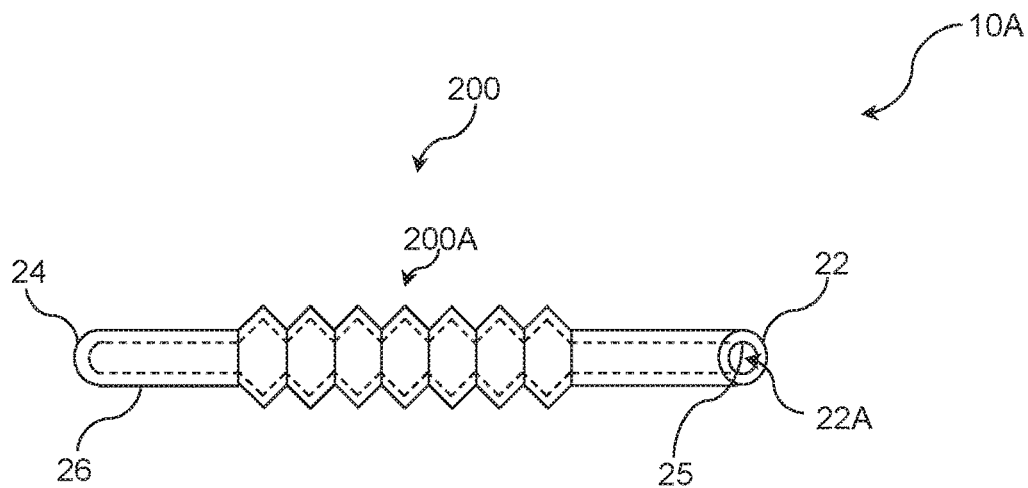
FIGS. 3 to 8 show schematic representations of disposable antimicrobial sleeves for covering an arm of a pair of spectacles in accordance with other preferred embodiments of the present invention.

FIG. 3 shows a disposable sleeve 10A having an antimicrobial property for use in covering a spectacle arm 140A, 1408 of a pair of spectacles 100 according to another preferred embodiment of the present invention. The antimicrobial sleeve 10A, which is also manufactured from a material having good elasticity, flexibility and durability, comprises essentially the same features as the antimicrobial sleeve 10 above, but with the addition of a concertinaed portion, denoted in FIG. 3 as 200A, disposed generally at the midsection of the tubular body 200. The concertinaed portion 200A is configured with a generally corrugated, fluted or concertina-like appearance and is designed to selectively extend and/or retract according to an overall length of the tubular body 200, to allow for extra incremental range and length of adjustment to extend the sleeve 10A for longer spectacle arms 140A, 140B. The concertinaed portion 200A allows for incremental lengths without compromising the sleeve's 10A qualities and effectiveness through excessive stretching to cover the hinge portion 130A, 130B.

The concertinaed portion 200A is particularly beneficial at a microscopic level where the material used in the manufacture of the antimicrobial sleeve 10A must be able to give, rather than weaken or break, when stressed. Weak areas due to stretching may compromise barrier protection and open a passageway for the contamination, manifestation and proliferation of hazardous chemicals, infectious agents, microbes and their associated toxins on the spectacle arm 140A, 140B and hinge portion 130A, 130B.

By the same token, the concertinaed portion 200A also ensures that the antimicrobial sleeve 10A can be fitted to a wide range of spectacle arms 140A, 140B of varying length, and yet still form a good seal.

The antimicrobial sleeve 10A may be manufactured according to a similar process to that described above. In this case however, the prefabricated former will have a section having a generally corrugated, fluted or concertina-like appearance to produce the extendable/retractable concertinaed portion 200A.

In other embodiments, the concertinaed portion 200A of the tubular body 200 may be located at any position along the length of the tubular body 200.

In other embodiments, the tubular body 200 may comprise more than one concertinaed portion (not shown).

In other embodiments, the entire length of the tubular body 200 may be configured as concertinaed so as to be extendable/retractable as required.

Tab portions

Figure 4:
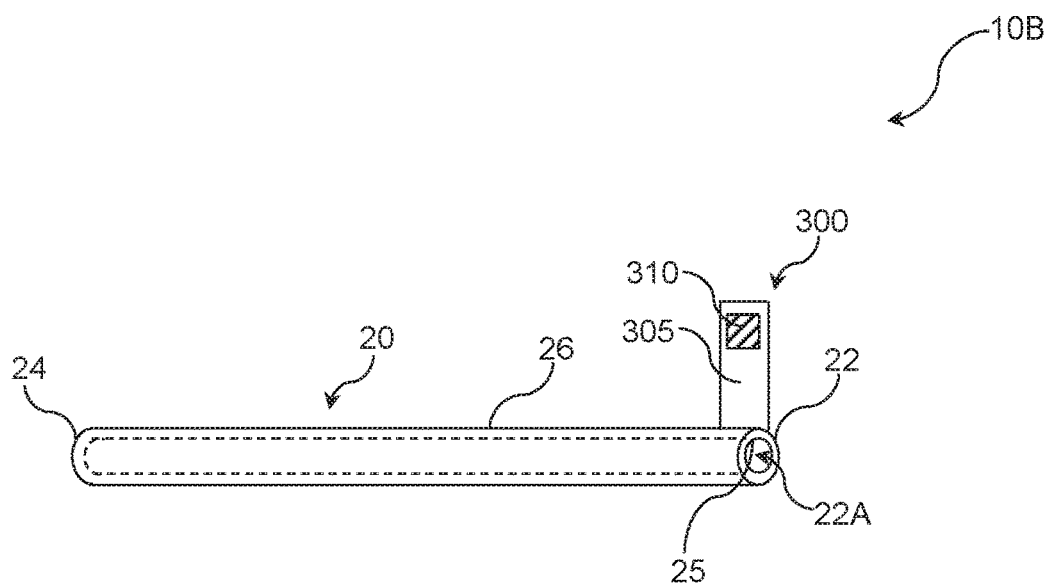

FIG. 4 shows a disposable sleeve 10B having an antimicrobial property for use in covering a spectacle arm 140A, 140B of a pair of spectacles 100 according to another preferred embodiment of the present invention. The antimicrobial sleeve 10B, which is also manufactured from a material having good durability, elasticity and flexibility, comprises essentially the same features as the antimicrobial sleeve 10 above, but with the addition of a tab portion, denoted in FIG. 4 as 300, located adjacent the opening 22A at the first end 22 of the tubular body 20.

The tab portion 300 aids in securing the antimicrobial sleeve 10B to the corresponding spectacle arm 140A, 140B to which it has been applied, and sealing the opening 22A tightly around the hinge portion 130A, 130B so as to reduce the likelihood of contaminants seeping through the opening 22A to contaminate the hinge portion 130A, 130B.

As shown in FIG. 4, the tab portion 300 comprises a low tack adhesive strip 310 disposed on a surface 305 of the tab portion 300 for temporarily adhering the tab portion 300 to one of the following: the external surface 26 of the tubular body 20, the corresponding spectacle arm 140A, 140B to which the antimicrobial sleeve 10B has been applied, or to the corresponding lens 115A, 115B adjacent the spectacle arm 140A, 140B.

It will be appreciated that the use of a low tack adhesive strip 310 provides a simple and convenient means by which to secure the antimicrobial sleeve 10B temporarily onto the spectacle arm 140A, 140B for the duration of use. Moreover, unlike conventional fastening means such as hook and loop fastening means, wire(s), rigid design of lugs covered by paper and plastics material, hems, or simple ties, the use of low tack adhesive strip 310 provides a much improved means by which to reduce the ingress of moisture through the opening 22A of the tubular body 20 by virtue of the tubular body 20 being secured tightly around the corresponding spectacle arm 140A, 140B in a sealing engagement, thereby reducing the likelihood of water and/or other liquid contaminants reaching, and thus damaging, the hinge portion 130A, 130B in use.

In other embodiments, the tab portion 300 is not limited to being disposed adjacent the opening 22A in the manner shown in FIG. 4, but may instead extend from the first end 22 of the tubular body 20 along the same longitudinal axis of the tubular body 20.

Figure 5:
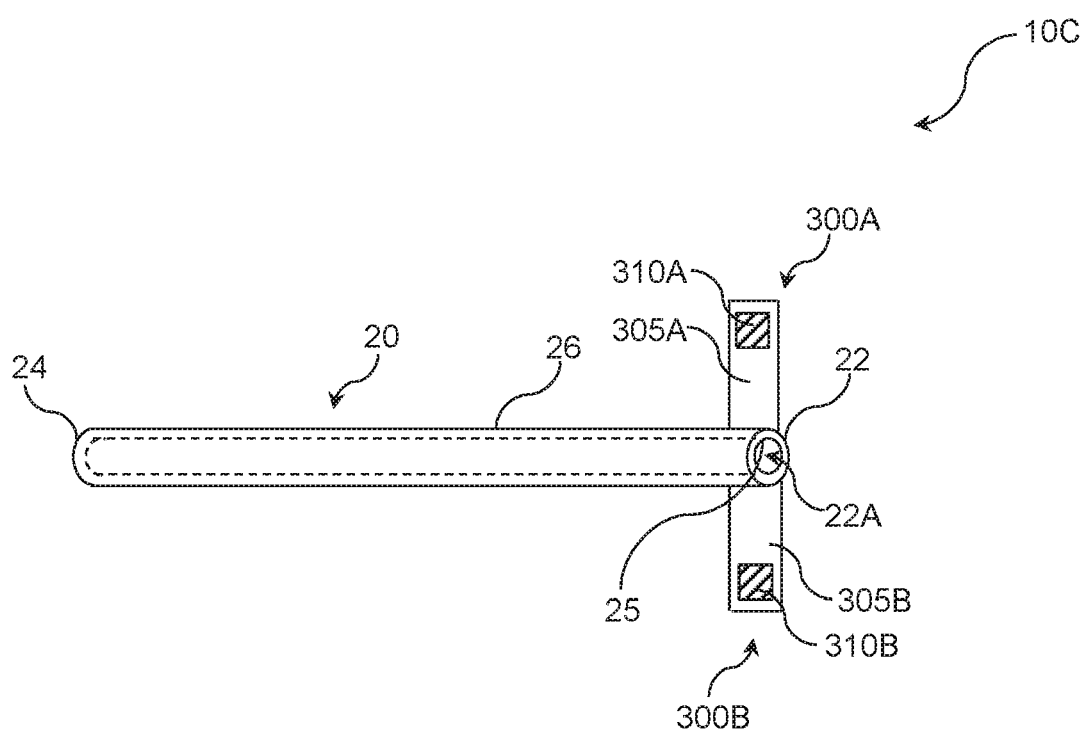

FIG. 5 shows a disposable sleeve 10C having an antimicrobial property for use in covering a spectacle arm 140A, 140B of a pair of spectacles 100 according to another preferred embodiment of the present invention. The antimicrobial sleeve 10C, which is also manufactured from a material having good durability, elasticity and flexibility, comprises essentially the same features as the antimicrobial sleeve 10 above, but with the addition of two tab portions, denoted in FIG. 5 as 300A, 300B, respectively, located adjacent the opening 22A at the first end 22 of the tubular body 20. Each tab portion 300A, 300B comprises one half of a complementary fastener pairing 310A, 310B as described above disposed on a corresponding surface 305A, 305B thereof that are configured to engage one another to secure the antimicrobial sleeve 10C to the spectacle arm 140A, 140B in use.

Figure 6:
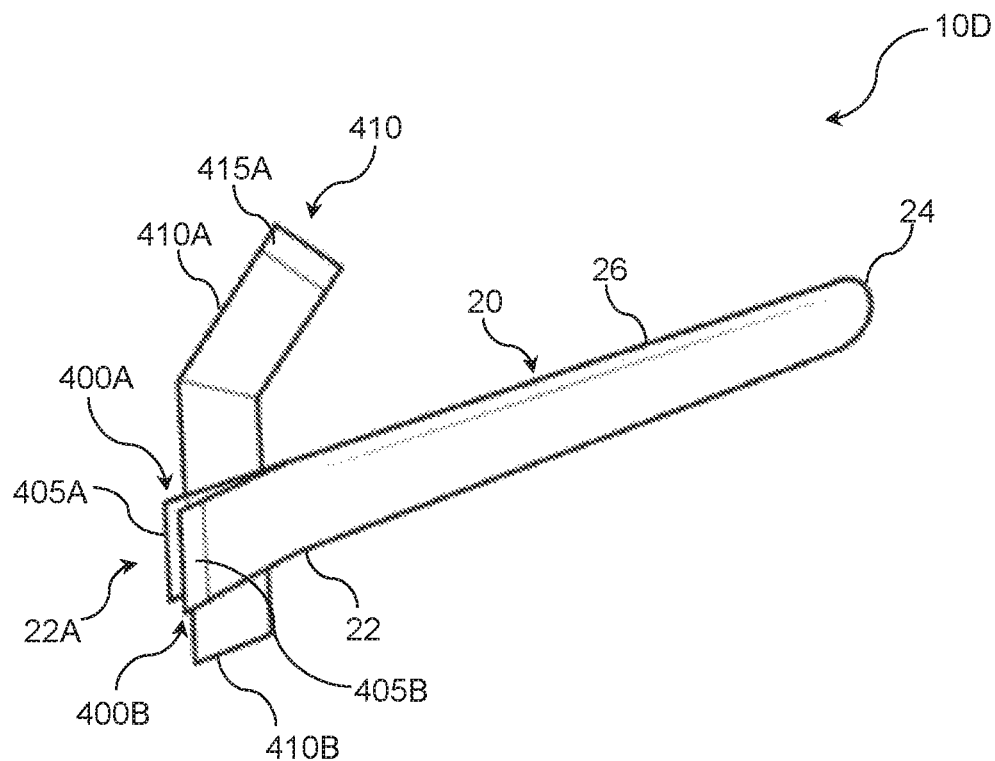
Figure 6:
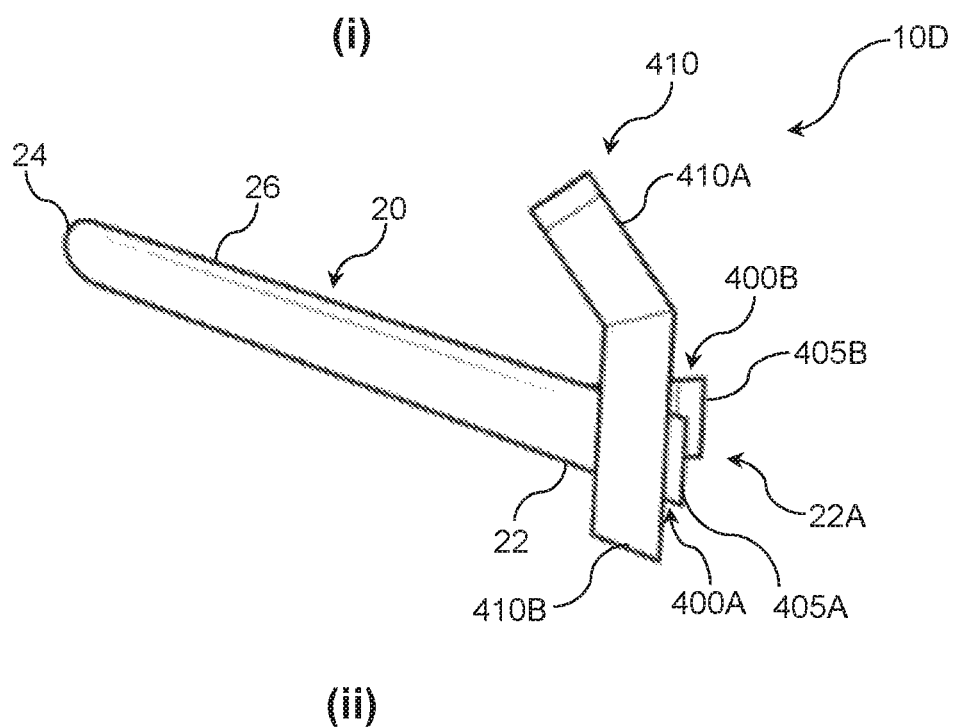
Figure 7:
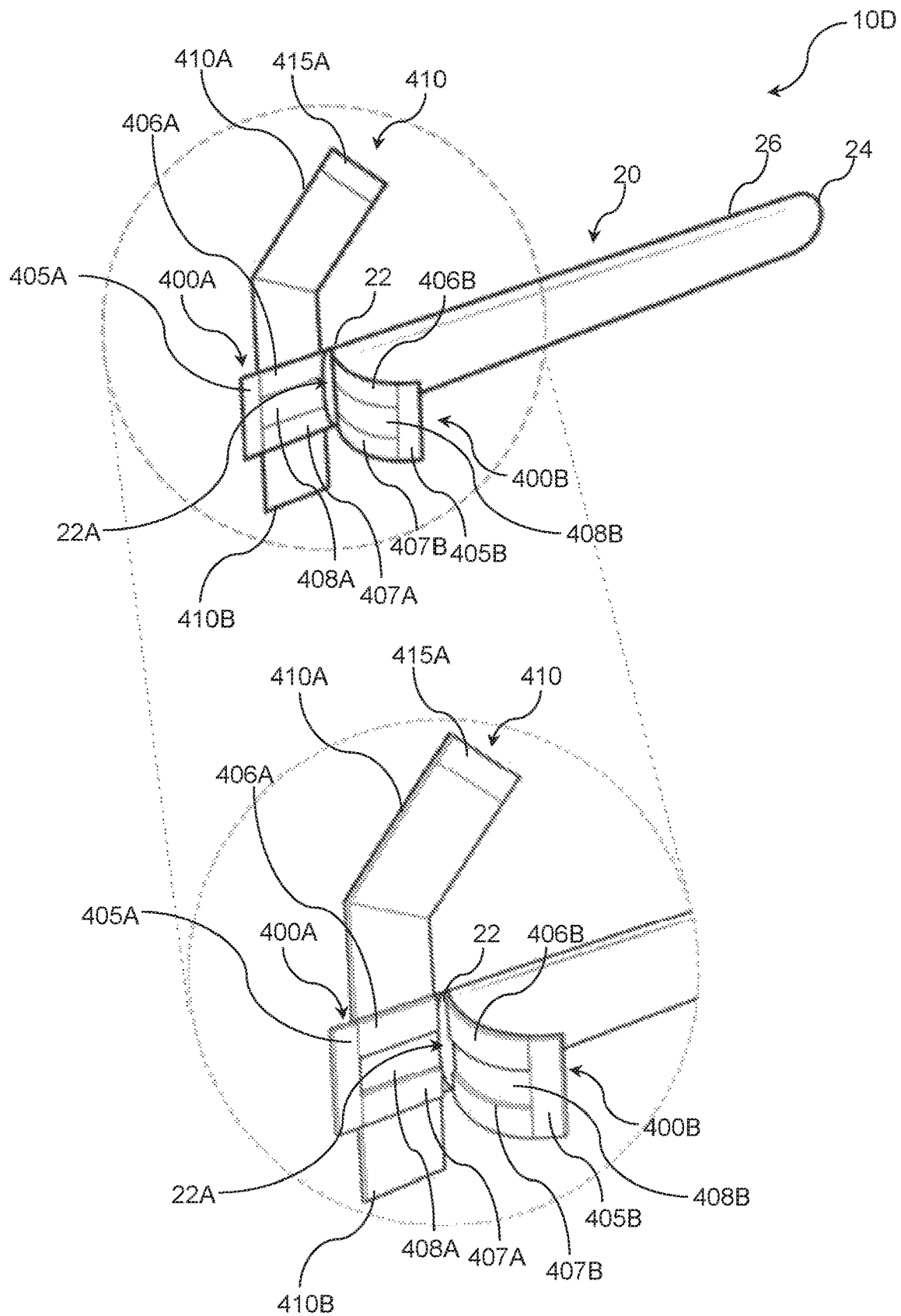
Figure 8:
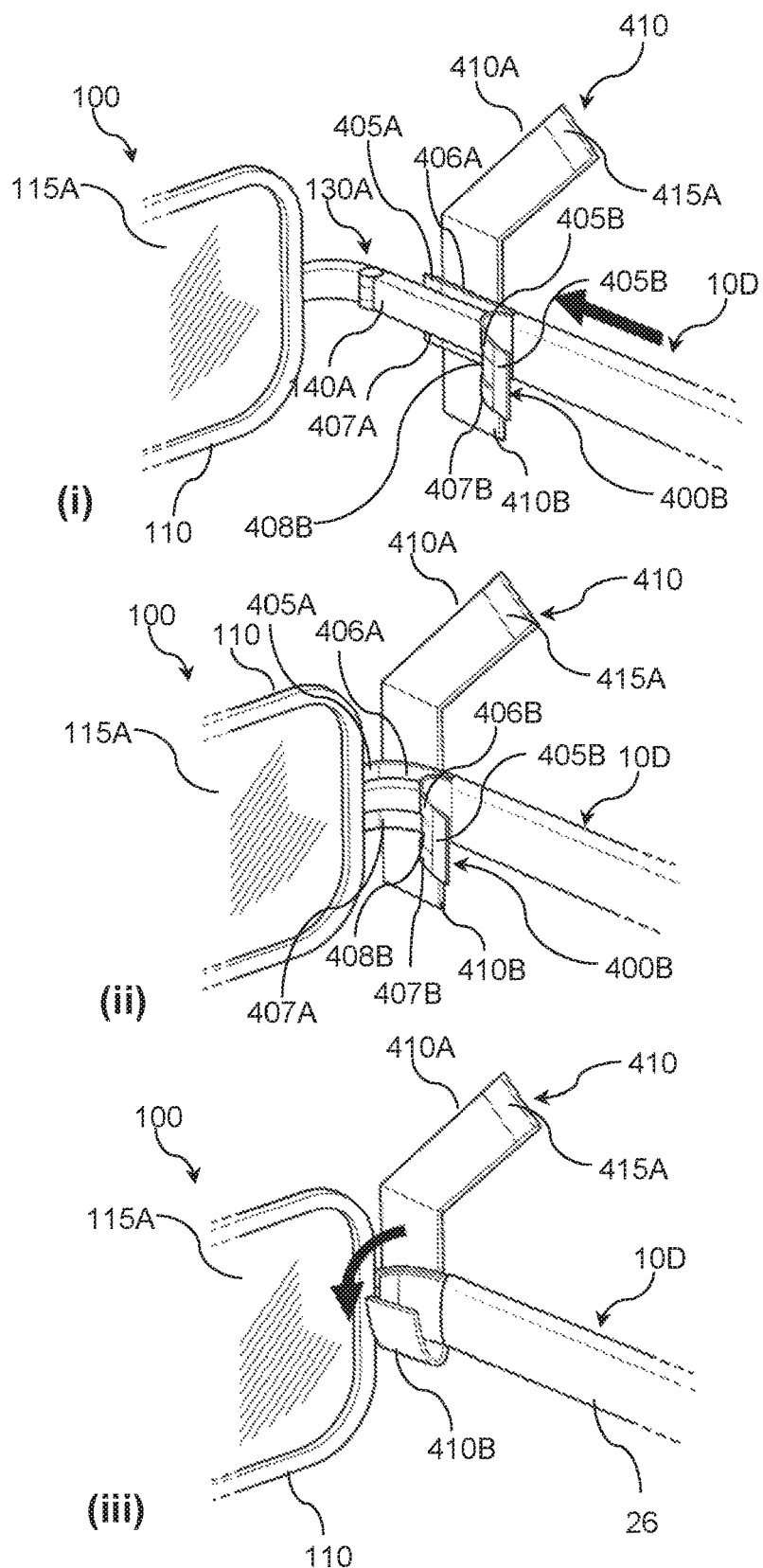
Figure 8:
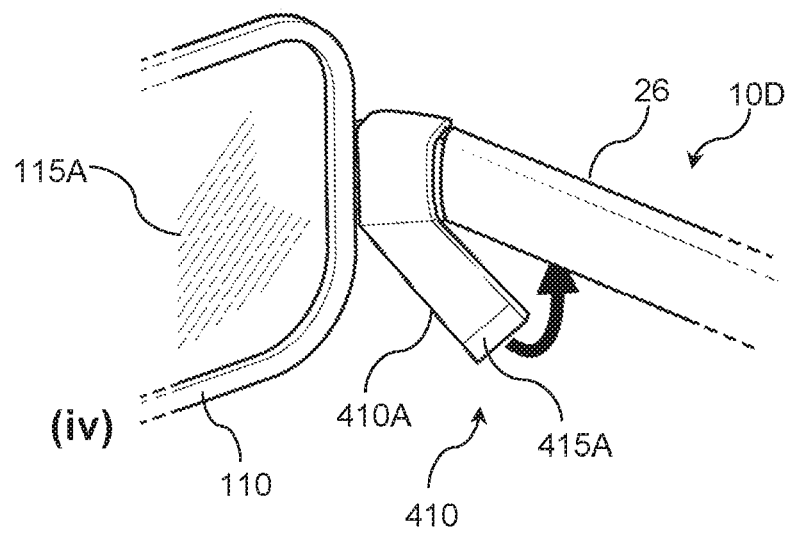
Figure 8:
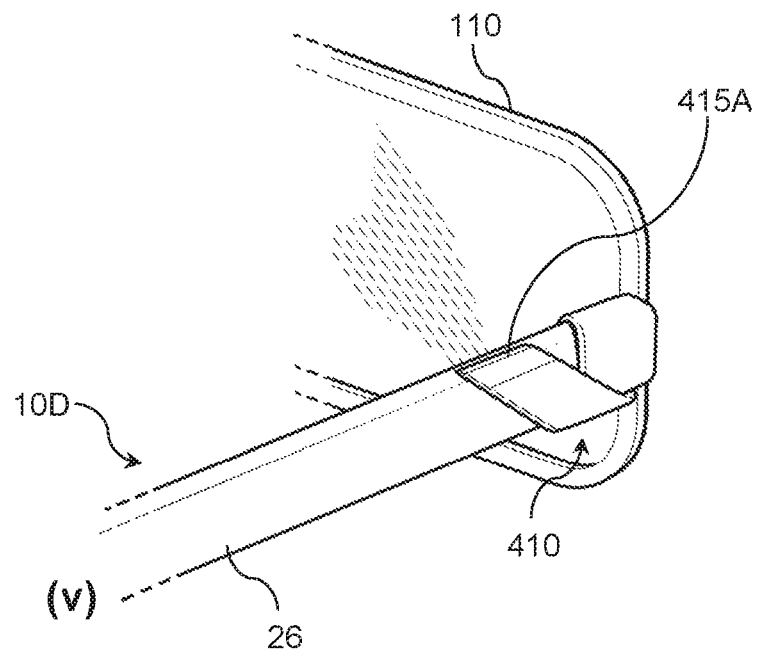

FIGS. 6 to 8 show a disposable sleeve 10D having an antimicrobial property for use in covering a spectacle arm 140A, 140B of a pair of spectacles 100 according to another preferred embodiment of the present invention. The antimicrobial sleeve 10D, which is also manufactured from a material having good elasticity, durability and flexibility, comprises essentially the same features as the antimicrobial sleeve 10 above, but with the addition of two tab portions, denoted in FIGS. 6 to 8 as 400A and 400B, respectively, which are located adjacent the opening 22A at the first end 22 of the tubular body 20, together with an additional tab portion 410 attached to an external surface of the first tab portion 400A and oriented generally orthogonal to a longitudinal axis of the tubular body 20 of the antimicrobial sleeve 10D.

FIG. 6 shows front (i) and rear (ii) perspective views of the antimicrobial sleeve 10D. Located at a terminal end of each tab portion 400A, 400B is an additional tab portion 405A, 405B. These additional tab portions 405A, 405B are present for ease of removal, and have no adhering qualities, thereby allowing the wearer to avoid touching the contaminated antimicrobial sleeve 10D after use. The sealing tab portion 410 is divided into a first and second sealing tab portion, designated in FIGS. 6 to 8 as 410A and 410B, respectively. Disposed on an inner surface of the first sealing tab portion 410A is a low tack adhesive (not shown). Located at a terminal end of the first sealing tab portion 410A is an additional tab portion 415A having no adhering qualities.

FIG. 7 shows the same front perspective view of the antimicrobial sleeve 10D, but this time with the second tab portion 400B peeled back to reveal low tack adhesive strips (406A, 407A and 406B, 407B) disposed on the inner surface of each of the two tab portions 400A, 400B. The portion of the inner surface located between the two adhesive strips (406A, 407A and 406B, 407B) of each tab portion 400A, 400B, denoted in FIGS. 7 and 8 as 408A, 408B, also comprises a low tack adhesive.

In use, and, as shown in FIG. 8 (i) and (ii), the antimicrobial sleeve 10D is applied onto a corresponding spectacle arm 140A of the pair of spectacles 100 by passing the distal or temple tip 145A through the opening 22A at the first end 22 of the tubular body 20 and then sliding the antimicrobial sleeve 10D along the full length of the spectacle arm 140A until the temple tip 145A is substantially received within the closed end 24 of the tubular body 20.

Once the antimicrobial sleeve 10D is in place, the adhesive strips 406A, 407A and 406B, 407B on the two tab portions 400A, 400B are effectively located so that they extend above or below the hinge portion 130A of the spectacle arm 140A according to their orientation relative to the spectacle arm 140A. In this respect, the two tab portions 400A, 400B can be brought together so that the adhesive strips 406A, 407A on the first tab portion 400A can engage and adhere to the corresponding adhesive strip 406B, 407B on the second tab portion 400B, while the remaining adhesive strip 408A, 408B on the inner surface of each corresponding tab portion 400A, 400B can engage and adhere to a corresponding surface of the spectacle arm 140A, thereby covering the inner and outer surfaces of the hinge portion 130A. The two terminal end tab portions 405A, 405B extend beyond the hinge portion 130A and effectively overlap either side of a small portion of the spectacle frame 110 at the corresponding lens 115A of the spectacles 100 for additional shielding purposes to preclude contaminants from penetrating the antimicrobial sleeve 10D to contaminate the hinge portion 130A, 130B. By virtue of this arrangement, the hinge portion 130A is fully enclosed between the two tab portions 400A, 400B.

As shown in FIG. 8 (iii), the second sealing tab portion 410B is folded up over the now secured second tab portion 400B and subsequently adhered to an outer surface thereof. The first sealing tab portion 410A is then folded down over the now secured second sealing tab portion 410B as indicated by the bold arrow in FIG. 8 (iii) and subsequently wrapped around the hinge portion 130A as indicated by the bold arrow in FIG. 8 (iv) so as to fully secure the second sealing tab portion 410B against the secured second tab portion 400B.

As shown in FIG. 8 (v), the first sealing tab portion 410A is then adhered to an external surface of itself or to the external surface 26 of the tubular body 20 of the antimicrobial sleeve 10D to ensure a good seal. By virtue of the terminal end tab portion 415A having no adhering qualities, it is free to be used as a means by which to initiate the removal of the antimicrobial sleeve 10D from the spectacle arm 140A.

By virtue of this arrangement, the sealing tab portions 410A, 410B not only aid in securing the antimicrobial sleeve 10D to the spectacle arm 140A, they also ensure that the spectacle arm 140A and corresponding hinge portion 130A are completely sealed within the antimicrobial sleeve 10D and thus protected from potential contamination, either by exposure to airborne contaminants or from inadvertent touching by the wearer with a contaminated hand or glove, when the spectacles 100 are worn in use.

To remove the antimicrobial sleeve 10D from the spectacle arm 140A, one simply provides a manual pulling force to the terminal end tab portion 415A so as to peel the first sealing tab portion 410A away from the external surface to which it is adhered. And, by maintaining the pulling force, the second sealing tab portion 410B is subsequently peeled away from the second tab portion 400B to which it is adhered, thereby freeing up the first and second tab portions 400A, 400B to be separated from each other by virtue of the adhesion between the corresponding adhesive strips (406A, 407A, 406B, 407B). Once the first and second tab portions 400A, 400B are separated, the antimicrobial sleeve 10D can be slid back along the length of the spectacle arm 140A, or peeled back over itself such that the antimicrobial sleeve 10D is gradually turned inside out preventing any contamination on the external surface of the antimicrobial sleeve 10D from coming into contact with the spectacle arm 140A, the hinge portion 130A or indeed the wearer upon removal of the antimicrobial sleeve 10D from the spectacle arm 140A.

In essence, the antimicrobial sleeve 10D effectively shields the spectacle arm 140A, 140B and the corresponding hinge portion 130A, 130B from the environment, substantially removing any passageway for the exposure of these parts of the spectacles 100 to potential contamination, manifestation and proliferation of infectious agents, microbes and their associated toxins, and/or exposure to potentially hazardous chemicals that could damage these parts of the spectacles 100.

Nose Bridge Cover

According to another embodiment of the present invention, there is provided a kit for use with a pair of spectacles 100. The kit according to this embodiment includes at least one pair of any of the disposable antimicrobial sleeves 10, 10A, 10B, 10C, 10D as described above and a disposable nose bridge cover 500, which comprises a generally hexagonal shaped flat sheet 510 having at least one antimicrobial agent containing component that is applied to a surface of the sheet 510 and/or dispersed therein, to impart antimicrobial properties thereto. The antimicrobial nose bridge cover 500 is also manufactured from the same material properties used in the manufacture of the antimicrobial sleeve 10.

Figure 9:
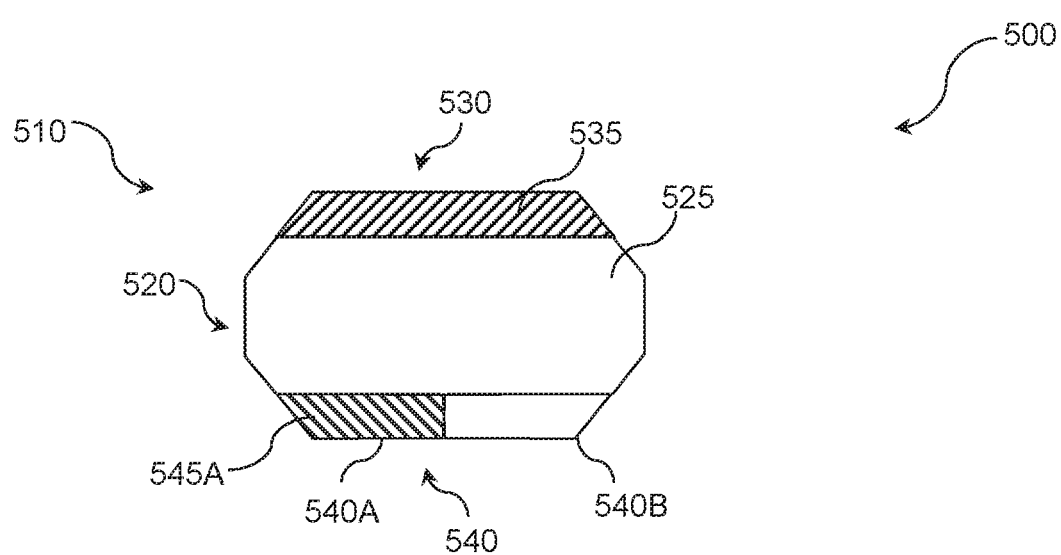
FIG. 9 shows a disposable nose bridge cover having an antimicrobial property for covering a nose bridge portion of a pair of spectacles in accordance with another preferred embodiment of the present invention.

As shown in FIG. 9, the sheet 510 comprises a central body portion 520 having an internal surface 525 and two tab portions 530, 540. The first tab portion 530 bears a low tack adhesive strip applied to an internal surface 535 thereof. The second tab portion 540 is divided into two sections 540A, 540B, where the first section 540 bears a low tack adhesive strip applied to an internal surface 545 thereof, while the second section 540B bears no adhering qualities whatsoever and facilitates ease of removal.

In use, the first tab portion 530 of the sheet 510 is adhered directly to the nose bridge portion 120. The central body portion 520 of the sheet 510 is then wrapped around the nose bridge portion 120 of the spectacles 100 to fully enclose the nose bridge portion 120, thereby the entire nose bridge portion 120 is essentially quarantined and protected thus reducing the risk of the nose bridge portion 120 becoming contaminated. The second tab portion 540 is then adhered to an external surface of the sheet 510 via the first section 540A to secure the nose bridge cover 500 tightly around the nose bridge portion 120 in a sealing engagement, thereby reducing the likelihood of water and/or other liquid contaminants reaching, and thus damaging, the nose bridge portion 120 in use.

To remove the nose bridge cover 500 from the nose bridge portion 120 of the spectacles 120, one simply applies a manual pulling force to the second section 540B in the opposite direction to its application, to facilitate ease of removal.

In other embodiments, it will be appreciated that the internal surface 525 of the central body portion 520 may comprise non-slip material or texturing i.e. nodules (not shown) to reduce or inhibit the nose bridge cover 500 from slipping off or rotating around the nose bridge portion 120 while in use. Such undesirable movement of the nose bridge cover 500 in use would not only cause discomfort to the wearer but could also compromise protection against exposure to hazardous chemicals, infectious agents and their associated toxins.

In other embodiments, it will be appreciated that the internal surface 525 of the central body portion 520 may also comprise a temporary low tack adhesive to adhere the body portion 520 directly to the nose bridge portion 120 so as to reduce the likelihood of the nose bridge cover 500 sliding off or rotating around the nose bridge portion 120 while in use. Furthermore, the temporary low tack adhesive effectively seals and quarantines the nose bridge portion 120 by ensuring that the edges of the sheet 510 are substantially adhered to the nose bridge portion 120 and therefore sealed against any incursion from the cross-contamination, manifestation and proliferation of infectious agents, microbes and their associated toxins.

The pairs of spectacles 100 shown in FIGS. 2 and 6, and in particular, the spectacle arms 140A, 140B and the nose bridge portion 120 thereof, are merely representative of one possible design to demonstrate how the antimicrobial sleeves 10, 10A, 10B, 10C, 10D and the nose bridge cover 500 of the various embodiments above can be applied in use. As such, it will be appreciated by those skilled in the relevant art that the antimicrobial sleeves 10, 10A, 10B, 10C, 10D and the nose bridge cover 500 of the embodiments described herein are sufficiently flexible to conform respectively to the contours of the spectacle arms 140A, 140B and nose bridge portion 120 of a range of different spectacles 100.

Advantages

From the foregoing discussion, it should be apparent to a skilled person in the art that the antimicrobial sleeves 10, 10A, 10B, 10C, 10D and antimicrobial nose bridge cover 500 of the present invention provide the following distinct advantages over existing covers or sleeves used for protecting corresponding parts of the frame 110 of a pair of spectacles 100:

- The use of an antimicrobial agent containing component in the manufacture of the antimicrobial sleeves 10, 10A, 10B, 10C, 10D and the corresponding antimicrobial nose bridge cover 500 provides a convenient means by which to reduce the likelihood of the spectacle arms 140A, 140B (and corresponding hinge portions 130A, 130B) and the nose bridge portion 120 of the spectacles 100 becoming a focal source of contamination and a passageway for the cross-contamination, manifestation and proliferation of infectious agents, microbes and their associated toxins. This is beneficial from the point of view that if, for example a surgeon, is required to wear their spectacles 100 for the duration of a long operating procedure, then in the event that the spectacles 100 are sprayed with a patient's bodily fluid or the surgeon inadvertently touches his/her spectacles 100 to adjust their position, any potential microbes, infectious agents and the like, that may be present in the bodily fluid or on the surgeon's hands or gloves, is precluded from manifestation and proliferation by the antimicrobial agent containing component. For instance, in the case where the antimicrobial agent containing component is a silver ion containing component, the silver ions which are released from the surface of the antimicrobial sleeves 10, 10A, 10B, 10C, 10D, act in a self-disinfecting manner against the infectious agents or microbes to destroy them.

- By virtue of the tubular body 20 of the antimicrobial sleeves 10, 10A, 10B, 10C, 10D extending along the entire length of the spectacle arm 140A, 140B from the temple tip 145A, 145B all the way to the lens frame apertures 110A, 110B, the spectacle arm 140A, 140B as well as the corresponding hinge portion 130A, 130B, are fully enclosed within the tubular body 20 of the antimicrobial sleeves 10, 10A, 10B, 10C, 10D, and therefore isolated from potential sources of contamination in use.

- By virtue of the antimicrobial sleeves 10, 10A, 10B, 10C, 10D and the antimicrobial nose bridge cover 500 being able to fully enclose, and therefore, isolate the most intricate areas of a pair of spectacles 100, most notably, the mechanism at the hinge portions 130A, 130B from potential contamination, the use of antisepsis/disinfectant wipes to clean or wipe down these difficult-to-reach parts of the spectacles 100 is necessarily avoided, thereby dramatically reducing the likelihood of cross-contamination, manifestation and proliferation of infectious agents, microbes and their associated toxins, within these areas.

By the same token, protecting these intricate areas of the spectacles 100 from any buildup of hazardous chemicals through either exposure to said chemicals in a laboratory situation, or simply via attempts to sterilize the spectacles 100 using standard sterilization procedures, will reduce the likelihood of the various parts of the spectacles from becoming discolored, corroded and/or permanently damaged over time, thereby prolonging the life and functionality of the spectacles 100. Moreover, the expense and length of processing associated with performing such sterilization techniques are necessarily avoided.

By virtue of the antimicrobial sleeves 10, 10A, 10B, 10C, 10D being manufactured from a polymer having high elongation and flexibility or elasticity such as an elastomer, they are not only durable and highly resistant to deformation, they are also able to conform snugly to the contour of the spectacle arm 140A, 140B (and corresponding hinge portion 130A, 130B) where their dimension and design allow. In this respect, the formation of defects such as buckling or notches of the antimicrobial sleeve 10, 10A, 10B, 10C, 10D, particularly at the hinge portions 130A, 130B, is significantly reduced, thereby reducing the number of sites that may harbour hazardous chemicals and/or microbes that could lead to significant contamination.

By the same token, by introducing one or more concertinaed portions 220A along the length of the antimicrobial sleeves 10, 10A, 10B, 10C, 10D provides additional means by which to allow the sleeve material to give rather than weaken or break when put under stress such as during the process of applying or removing the antimicrobial sleeves 10, 10A, 10B, 10C, 10D from the spectacle arm 140A, 140B.

By the same token, the concertinaed portion 200A also ensures that the antimicrobial sleeves 10, 10A, 10B, 10C, 10D can be fitted to a wide range of spectacle arms 140A, 140B of varying length, and yet still form a good seal.

By virtue of the antimicrobial sleeves 10, 10A, 10B, 10C, 10D being manufactured by a process such as dipping, the tubular body 20 of the sleeves is seamless and continuous with no joins, weld lines or perforations along its length that could allow a potential contaminant to seep through the wall of the tubular body 20 to compromise barrier protection.

In addition, simply by producing the antimicrobial sleeves 10, 10A, 10B, 10C, 10D as an elongate tubular body 20 having flexibility and elasticity rather than having a shape that conforms to the specific shape of a spectacle arm 140A, 140B, such as a curvature at the closed end 24 to conform to the generally curved appearance of the temple tip of a spectacle arm 140A, 140B, this removes the need to further cut, weld, and/or heat the tubular body 20 in order to achieve the desired shape, thereby reducing the likelihood of holes or defects being formed in the tubular body 20 of the antimicrobial sleeves 10, 10A, 10B, 10C, 10D.

By virtue of the antimicrobial sleeves 10, 10A, 10B, 10C, 10D and the antimicrobial nose bridge cover 500 being disposable, the wearer can simply discard these items after use and apply new antimicrobial sleeves 10, 10A, 10B, 10C, 10D and a nose bridge cover 500 as required.

By virtue of a number of the tab portions of the antimicrobial sleeve 10D shown in FIGS. 6 to 8 comprising a low tack adhesive strip, these tab portions enable not only a means by which to secure the antimicrobial sleeve 10D to the spectacle arm 140A, 140B, they also provide a means by which to seal the opening 22A of the antimicrobial sleeve 10D to thus shield and protect the spectacle arm 140A, 140B and corresponding hinge portion 130A, 130B enclosed within from potential contamination, either by exposure to airborne contaminants or from inadvertent touching by the wearer with a contaminated hand or glove, when the spectacles 100 are worn in use.

Interpretation

Embodiments:

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Future patent applications may be filed in Australia or overseas on the basis of or claiming priority from the present application. It is to be understood that the following claims are provided by way of example only, and are not intended to limit the scope of what may be claimed in any such future application. Features may be added to, or omitted from the claims at a later date so as to further define or re-define the invention or inventions.

SCOPE OF INVENTION

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to at least the medical and healthcare sector, with propensity for application in the personal care sector, the food sector and the chemical and life sciences sector.

The invention claimed is:

1. A disposable sleeve having an antimicrobial property for covering an arm of a pair of spectacles, the disposable sleeve comprising the combination of:
   a) a tubular body configured to cover the arm of the pair of spectacles, the tubular body having:
      (i) an opening at a first end thereof for receiving the spectacle arm, and a second end opposite the first end that is closed;
      (ii) at least one tab portion located adjacent the opening, the at least one tab portion comprising a low tack adhesive strip for temporarily adhering the at least one tab portion to one of an external portion of the tubular body, the spectacle arm, a lens and a lens frame portion of the pair of spectacles for securing the sleeve to the spectacle arm in a sealing engagement in use;
   wherein the tubular body is elasticated, seamless, and comprises at least one concertinaed portion located between the first end and the second end, and the at least one concertinaed portion is configured to selectively extend or retract to thereby adjust the length of the spectacle arm coverable by the tubular body; and
   b) at least one antimicrobial agent containing component applied to a surface of the tubular body and/or dispersed therein, to impart the antimicrobial property thereto.

2. A sleeve according to claim 1, wherein the at least one antimicrobial agent containing component comprises an antimicrobial agent selected from the group consisting of an oligodynamic metal ion, a quaternary ammonium compound, a biocide, an antibiotic and a photocatalyst and mixtures thereof.

3. A sleeve according to claim 2, wherein the oligodynamic metal ion is derived from a metal selected from the group consisting of silver, gold, platinum, palladium, iridium, copper, antimony, bismuth, zinc and alloys thereof and mixtures thereof.

4. A sleeve according to claim 1, wherein the at least one antimicrobial agent containing component comprises a silver metal ion containing component.

5. A sleeve according to claim 1, wherein the at least one antimicrobial agent containing component comprises a plurality of particles, each particle having oligodynamic metal ions applied to a surface thereof and/or dispersed therein.

6. A sleeve according to claim 5, wherein the particles comprise particles of glass, silica or titanium dioxide.

7. A sleeve according to claim 1, wherein the at least one antimicrobial agent containing component comprises a plurality of zeolite particles, each zeolite particle having a plurality of ion-exchangeable sites for retaining oligodynamic metal ions via an ion-exchange reaction.

8. A sleeve according to claim 1, wherein the at least one antimicrobial agent containing component comprises a plurality of particles of copper or silver.

9. A sleeve according to claim 1, wherein the tubular body is formed from a polymer selected from the group consisting of silicones, neoprene, polyisoprenes, polybutadiene, polychloroprenes, polystyrenes, polyurethanes, polyolefins, polyvinyls, natural rubbers, synthetic rubbers, latex and mixtures thereof.

10. A sleeve according to claim 1, wherein the spectacle arm comprises a hinge portion located adjacent to the lens or the lens frame portion of the pair of spectacles, the tubular body being configured to substantially receive and seal the hinge portion therewith in use.

11. A sleeve according to claim 1, wherein the spectacle arm comprises a temple tip located distal to the lens or the lens frame portion of the pair of spectacles, the tubular body extending from the temple tip substantially to the lens or lens frame portion in use.

12. A sleeve according to claim 1, wherein the tubular body comprises first and second tab portions each located adjacent the opening, and each having complementary securing portions that are configured to engage one another to secure the sleeve to the spectacle arm in a sealing engagement in use.

13. A sleeve according to claim 1, wherein the at least one tab portion is located adjacent the opening to facilitate sealing of a hinge portion of the spectacle arm substantially within the tubular body when the sleeve is secured to the spectacle arm in a sealing engagement in use.

14. A kit for use with a pair of spectacles, the kit including:
   one or more disposable sleeves as claimed in claim 1; and
   a disposable nose bridge cover having an antimicrobial property for covering a nose bridge portion of the pair of spectacles, the disposable nose bridge cover comprising a sheet having at least one antimicrobial agent containing component applied to a surface thereof and/or dispersed therein, to impart the antimicrobial property thereto.

15. The kit of claim 14, wherein the sheet comprises at least one tab portion to facilitate manual removal of the nose bridge cover from the nose bridge portion by applying a pulling force thereto, optionally wherein the at least one tab portion comprises a low tack adhesive strip arranged for temporarily adhering the at least one tab portion to one of an external portion of the sheet when wrapped around the nose bridge portion, and the nose bridge portion itself, in order to secure the disposable nose bridge cover in a sealing engagement thereto in use.

16. A sleeve according to claim 1, wherein at least one portion of the tubular body is formed from a non-slip material to reduce movement of the sleeve along the spectacle arm in use.

17. A sleeve according to claim 1, wherein the tubular body is formed from a silicone rubber.

18. A sleeve according to claim 1, wherein the tubular body has dispersed therein a plurality of particles, wherein the particles comprise particles of glass, silica or titanium dioxide.

19. A sleeve according to claim 1, wherein the at least one tab portion is an extension of the tubular body at the opening thereof.

20. A sleeve according to claim 1, wherein the concertinaed portion is configured with a generally corrugated, fluted or concertina-like appearance, to allow for extra incremental range and length of adjustment to extend the sleeve.

21. A sleeve according to claim 1, wherein the concertinaed portion of the tubular body is bounded by non-concertinaed portions of the tubular body at opposite ends thereof.

* * * * *